2,868,654
COMPOSITION OF MATTER AND PROCESS THEREFOR

Richard D. Haynes, Creve Coeur, Mo., assignor to Monsanto Chemical Company, St. Louis, Mo., a corporation of Delaware No Drawing. Application May 18, 1956
Serial No. 585,621

6 Claims. (Cl. 99—143)

The present invention relates to complex crystals of inorganic compounds and to the process for obtaining the same.

The present invention has as one of its objects the provision of complex salts containing a multiplicity of crystalline compounds. It is a further object of the invention to provide compositions of matter having utility in the food industry. It is likewise an object of the invention to provide a means for the direct provision of multicomponent solutions from a single crystalline product which provides a multiplicity of crystalline components for solution in a specific order.

It has been found that complex crystalline materials may be provided in a novel form whereby the solution of such crystalline components may be controlled in a specific sequential order to promote the ease and rapidity of solution and to avoid effects which tend to reduce the solubility of such individual components. The present invention contemplates the provision of complex crystalline compositions from individual discrete components to form complex crystals or granules. For example, a complex product may be prepared by the use of sodium chloride crystals as the nuclei around which additional crystalline or microcrystalline components may be oriented to obtain a stable product having particular advantages for use in the food industry. In a specific embodiment of the present invention, sodium chloride nuclei may be formed into a complex crystalline product together with disodium phosphate. Such a material is of great utility in the processing of meats whereby it is possible to obtain solutions containing a predetermined ratio of the said disodium phosphate and sodium chloride. Such a solution may be used as a brine pickle, for example, in the preparation of hams and bacon. It has been found that the use of the herein-described products is highly advantageous since it permits the provision of higher concentrations of the phosphate in the presence of sodium chloride than is possible by the direct addition of phosphate to a sodium chloride brine. Sodium triphosphate is another compound which is advantageously combined with sodium chloride for meat curing compositions by the above method.

The present invention contemplates the provision of various phosphate salts in combination with a sodium chloride crystal nucleus. Thus, the phosphate component may be monocalcium phosphate, monosodium phosphate, sodium pyrophosphate, disodium phosphate, trisodium phosphate, sodium acid pyrophosphate and also any of the various molecularly dehydrated phosphates such as sodium tripolyphosphate, sodium acid pyrophosphate and glassy sodium polyphosphates with chain lengths varying between 4 and 100, for example, sodium hexametaphosphates, etc. Combinations of phosphates may likewise be employed, e. g., trisodium phosphate together with sodium acid pyrophosphate. It has also been found that such complex products when compared to the crystalline forms of the individual components, are more stable against change in the water of crystallization. For example, certain molecularly dehydrated phosphates readily lose water when stored under atmospheric conditions, while other related compounds are deliquescent. The complex products of the present invention overcome these disadvantages since the complex material containing crystals of sodium chloride together with the said phosphate have been found to stabilize the water content of the freshly-prepared compositions despite considerable changes in humidity in the storage of the said complex materials. The products of the present invention may therefore be prepared as free-flowing complex crystalline materials. Since each crystal is essentially like every other crystal, the present products also eliminate separation and segregation of crystals by type during transit and storage.

The complex compositions of the present invention may in general be prepared by the spraying of a solution of the desired phosphate (preferably as an aqueous solution ranging from 5% to a saturated concentration) on crystals of sodium chloride while agitating the same. It has been found that the affinity of sodium chloride and water results in the rapid removal of water from the phosphate solution and the crystallization of the said phosphate component in a complex with the crystalline structure of the sodium chloride. In this way an intimate microstructure is obtained to bind the individual components. The addition of further quantities of the phosphate component then results in the build-up of further oriented crystals of the phosphate. In addition, the relative proportions of the phosphate with respect to the sodium chloride nuclei may likewise be controlled. The proportions of the sodium chloride and the phosphate are not critical. In general, the weight of the phosphate may be from 1% to 1,000% by weight relative to the sodium chloride. The ultimate complex crystals may, therefore, be of about the same size as the original sodium chloride crystals, or may increase to several times the original crystal size at higher proportions of the phosphate component.

The temperature employed in crystallizing the present complex crystalline materials is not a critical factor. Crystallization from a concentrated solution may be carried out at room temperature, although higher temperatures may be used to accelerate the process. A preferred temperature range is from 50° C. to 120° C.

Since the crystal size of the sodium chloride is immaterial I may use any convenient grade of such salt. A product having the granulation of ordinary table salt has been used successfully. For some purposes a coarser grade of salt, such as is commonly referred to as rock salt, may be employed. When the present product is to be used in self-rising flour mixtures, it is, of course, desirable that a granulation be employed which has about the same particle size as the other ingredients employed.

The present process may be carried out in a crystallization pan in which an agitating rake provides excellent contacting of the sodium chloride crystalline nuclei with a phosphate solution which may be sprayed into the said crystallization pan. Another method of carrying out the present process is by the use of a calciner such as a rotary drum calciner which is preferably heated in order to accelerate the drying step as a phosphate solution is fed or sprayed into the apparatus. In this way the evaporation may be carried out quite rapidly and the product maintained in a free-flowing condition throughout the calciner. An advantage of the present process is that the quantity of water to be evaporated in the production of a complex crystalline material is far less than would be the case if each of the components were supplied from an aqueous solution, even if the said solution is saturated. Thus, it has been found that the provision of a complex crystalline product of sodium chloride and 20% by weight of disodium phosphate relative to the said sodium chloride can be carried out under the present procedure with the evaporation of only one-tenth as much water as would be necessary to obtain a mere mechanical mixture of crystals of sodium chloride and of disodium phosphate beginning with saturated aqueous solutions of these two components.

A specific embodiment of the present invention is shown in the following example. In order to prepare a composite crystalline product for meat curing, a solution was first made of 10 parts of sodium triphosphate and 100 parts of water. The phosphate was found to dissolve completely in the water. This solution was then added slowly by spraying upon twenty parts of crystalline sodium chloride with stirring while the phosphate solution was evaporated in an open pan evaporator. It was found that the dry product obtained after the evaporation of all of the water consisted of sodium chloride crystals which had been coated with the sodium triphosphate, thus forming a composite crystalline material which served as a convenient unitary source for the preparation of meat curing compounds. The product was found to have reduced caking tendencies during storage.

The complex crystalline products of the present invention, when formulated from sodium chloride crystal nuclei and a phosphate leavening agent, are particularly advantageous in the formulation of self-rising flours and prepared mixes. The phosphate component in this case is preferably sodium acid pyrophosphate or monocalcium phosphate (including hydrated and stabilized forms). This type of complex crystalline product when mixed with flour and sodium bicarbonate avoids the prior art difficulty of the formation of "shot balls." Thus, it has been observed that high humidity, high temperature and prolonged storage may cause the formation of tiny, hard lumps called "shot balls" in flours, cake mixes, muffin mixes, etc. when prepared from a direct mixture of flour, sodium chloride, leavening phosphates, and sodium bicarbonate (sugar, flavoring, shortening and other ingredients may also be present). The sodium chloride crystals have been found to be favorable nuclei for the formation of shot balls in such mixtures. However, the present complex crystals of sodium chloride coated with sodium pyrophosphate or monocalcium phosphate avoid the formation of shot balls in mixed formulations. The weight proportions of the above essential components in flour mixtures are preferably in the following ranges, giving individual consideration to the phosphate and salt components which, however, exist as complex crystals in the composition:

| | Percent |
|---|---|
| Flour | 90–98 |
| Sodium bicarbonate | 0.5–2.5 |
| Sodium chloride | 0.5–3.0 |
| Calcium phosphate monohydrate or sodium acid pyrophosphate | 0.2–4.5 |

What is claimed is:

1. A complex crystalline material comprising particles having a crystalline nucleus of sodium chloride, the said sodium chloride being surrounded by a phosphate selected from the group consisting of monocalcium phosphate, monosodium phosphate, sodium pyrophosphate, disodium phosphate, trisodium phosphate, sodium acid pyrophosphate, sodium hexametaphosphate, sodium tripolyphosphate, and mixtures thereof.

2. A composition as set forth in claim 1 in which the said phosphate is present in the proportion of from 1% to 1,000% by weight with respect to the said sodium chloride nucleus.

3. A composition comprising flour and sodium bicarbonate in combination with complex crystalline material comprising particles having a crystalline nucleus of sodium chloride, the said sodium chloride being surrounded by sodium acid pyrophosphate.

4. A composition comprising flour and sodium bicarbonate in combination with complex crystalline material comprising particles having a crystalline nucleus of sodium chloride, the said sodium chloride being surrounded by monocalcium pyrophosphate.

5. A process for making a complex crystalline composition which comprises spraying an aqueous solution containing 5% to 50% of a sodium phosphate upon crystalline sodium chloride nuclei, while heating the said nuclei at a temperature of from 50° C. to 120° C., whereby the proportion of the said sodium phosphate relative to the said sodium chloride is in the weight proportion of from 1% to 1,000%.

6. A process for making a complex crystalline composition which comprises spraying upon crystalline sodium chloride nuclei an aqueous solution containing 5% to saturation of a phosphate selected from the group consisting of monocalcium phosphate, monosodium phosphate, sodium pyrophosphate, disodium phosphate, trisodium phosphate, sodium acid pyrophosphate, sodium hexametaphosphate, sodium tripolyphosphate and mixtures thereof, while heating the said nuclei at a temperature of from 50° C. to 120° C., whereby the proportion of the said phosphate relative to the said sodium chloride is in the weight proportion of 1% to 1,000%.

References Cited in the file of this patent

UNITED STATES PATENTS

| 2,011,321 | Levinson | Aug. 13, 1935 |
| 2,175,955 | Harry et al. | Oct. 10, 1939 |
| 2,506,568 | Imes et al. | May 9, 1950 |